March 18, 1941.　　　M. R. McDANAL　　　2,235,406
SPECTACLE MOUNTING
Filed April 13, 1939
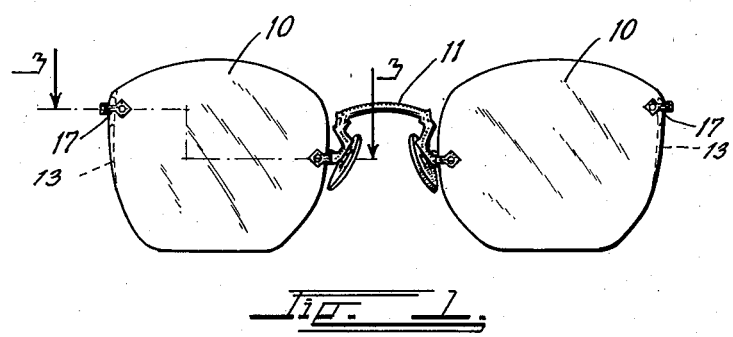
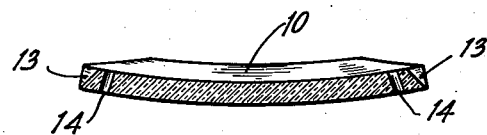
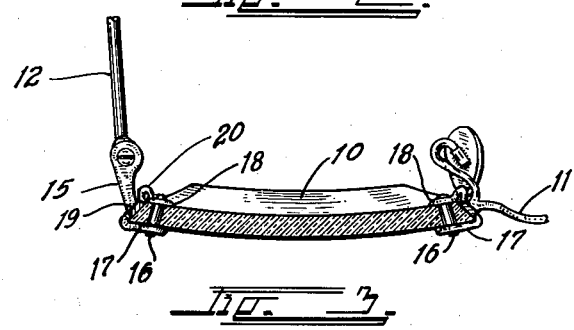
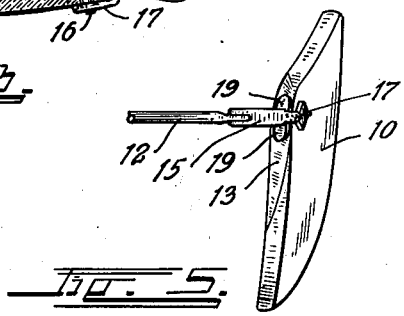
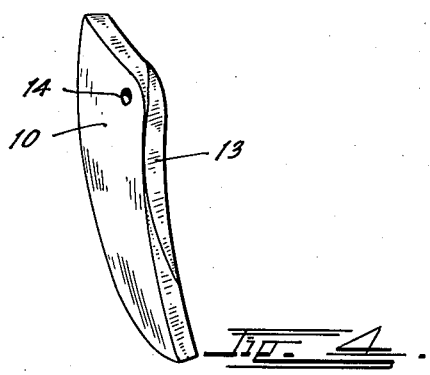
INVENTOR.
MICHAEL R. McDANAL.
BY
ATTORNEY.

Patented Mar. 18, 1941

2,235,406

UNITED STATES PATENT OFFICE 2,235,406

SPECTACLE MOUNTING

Michael R. McDanal, Denver, Colo.

Application April 13, 1939, Serial No. 267,581

4 Claims. (Cl. 88—47)

This invention relates to a spectacle of the rimless type and has for its principal object the provision of novel means for attaching the temple bow hinges and the bridge to the spectacle lenses in such a manner that the breaking strain on the lens at the point of attachment will be minimized so as to reduce breakage at the screw holes of the lenses.

In eye glasses or spectacles of the rimless type, the majority of cases are at the points where the temple bows and bridge are attached to the lens. This is due to the fact that the small area of glass between the screw hole and the edge of the lens is constantly subjected to a prying or bending strain from the attachment when the bows are bent or forced outwardly.

This invention is so designed as to eliminate the major portion of this prying action on the screws by so constructing the mounting and lens that the lens edge will absorb the thrust of the strains thereby relieving the screws and the faces of the lens from distorting stresses.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a front elevation of a typical pair of rimless spectacles with the invention applied thereto.

Fig. 2 is a horizontal section through a lens with the mountings removed.

Fig. 3 is an enlarged horizontal section, taken on the line 3—3, Fig. 1.

Fig. 4 is a detail perspective view of the lens prepared for receiving the mounting.

Fig. 5 is an end view of a lens and temple mounting.

In the spectacle illustrated, the lenses are indicated at 10, the bridge at 11, and the temple bows at 12, and temple bow mounting at 15.

The edge portions of the lenses 10 which are to receive the mountings for the bridge and temple bows are ground to a beveled surface 13 so that the edges at these points are inclined inwardly toward the rear face of the lens. The lens is drilled as indicated at 14 as is usual for receiving attachment screws 16, the drilling being done adjacent the beveled surfaces 13.

The temple mounting 15 and the bridge 11 are attached against these bevelled surfaces by means of a front screw arm 17 and back screw arm 18. The mounting may carry the usual lens edge straps 19 extending upward and downward therefrom along the lens edge. The rear screw arm is arched, as shown at 20, to shorten its length between the temple mounting 15, or the bridge mounting, and the screw 16 so as to incline the surface of the mounting which contacts the beveled edge of the lens, as shown in Fig. 3.

This construction accomplishes two results, first, it places the lens edge straps and the mounting behind the front faces of the lens where they are invisible, as shown in Fig. 1; second, it positions the mounting so that the pressure from any distorting or outward bending of the bows causes the mounting to bear directly against the edge of the lens whereas, in the usual mounting, any pressure tends to slide the mounting outward across the lens edge and to pull the lens edge straps away from the lens so as to exert a prying action on the screw 16. The latter prying on the screw breaks away a triangular piece from the lens.

It has been found by actual experience that the bow and mounting can be bent outwardly with from three to four times the force that can be applied to the usual mounting without breaking or chipping the lens at the screw hole.

The arch 20 in the back screw arm provides sufficient length to accommodate differing thickness of lenses. The ear bow mounting 15 extends at an inward angle from the lens edge straps so as to position the hinge almost directly in the rear of the straps. This also serves to conceal the mounting 15 and prevents its being accidentally caught or struck.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. In a spectacle having a pair of rimless lenses with a bridge member connecting said lenses and ear bows extending rearwardly from said lenses, means for attaching said ear bows to said lenses comprising: a mounting; a front arm and a rear arm projecting from said mounting; holes in said arms; an edge engaging surface on said mounting engaging the edge of the lens, the distance between the engaging surface and the hole in the rear arm being less than the corresponding distance in the front arm, the edge of said lens being beveled to accommodate the differing distances in the arms; and means extending through both of said holes and through said lens for attaching said arms thereto.

2. In a rimless spectacle having a temple mounting, a back screw arm on said mounting; a front screw arm on said mounting; and a screw passing through said lens substantially perpendicular to the surface thereof clamping said arms to said lens, said front arm being longer than said back arm to position the mounting at an inwardly inclined angle as the rear of the lens is approached, the edge of said lens being beveled at said mounting to correspond to the inwardly inclined angle thereof.

3. In a spectacle having a pair of rimless lenses with a bridge member connecting said lenses and ear bows extending rearwardly from said lenses, means for attaching said ear bows and said bridge member to said lens comprising: mountings; one of said mountings being secured to said bridge member, the other of said mountings being secured to said ear bow; a front arm on each mounting; a rear arm on each mounting; the rear arms being shorter than the front arms; the plane of said mounting being inclined with reference to the plane of said arms to accommodate their difference in length; and means for securing the opposite arms of each mounting to a lens, the edges of said lens being beveled to accommodate the angle of said mountings.

4. In a rimless spectacle the combination of a lens having an edge the plane of which is substantially radial with the curvature of the lens and a beveled mounting surface on said edge the plane of the mounting surface forming an acute angle with the tangent of the forward face of said lens and an obtuse angle with the tangent of the rearward face of said lens and a mounting having a lens edge portion resting against said mounting surface; a front screw arm extending from said lens edge portion over the front face of said lens; a back screw arm extending from said lens edge portion over the rear face of said lens; and an attachment screw extending through said lens between said arms, said screw being positioned closer to the lens edge portion of the mounting at said back screw arm than at said front screw arm.

MICHAEL R. McDANAL.